(12) United States Patent
Beckford et al.

(10) Patent No.: US 7,845,076 B2
(45) Date of Patent: Dec. 7, 2010

(54) METHOD FOR REDUCING STRESSES RESULTING FROM PARTIAL SLOT DOVETAIL RE-MACHINING FOR GENERATOR ROTOR

(75) Inventors: Alexander Gabriel Beckford, Glenville, NY (US); Madhu Bharadwaj, Karnataka (IN); John Peter Hoffman, St. Francis, MN (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 12/106,496

(22) Filed: Apr. 21, 2008

(65) Prior Publication Data

US 2009/0260221 A1    Oct. 22, 2009

(51) Int. Cl.
    *B21K 3/04*    (2006.01)
(52) U.S. Cl. ............... 29/889.1; 29/402.08; 29/598
(58) Field of Classification Search ........... 29/596–598, 29/402.03–402.06, 889.1; 310/214, 215, 310/270–271
    See application file for complete search history.

(56) References Cited

U.S. PATENT DOCUMENTS

| | | | | |
|---|---|---|---|---|
| 5,027,500 A | | 7/1991 | Keck et al. | |
| 5,172,475 A | * | 12/1992 | Amos et al. | 29/889.1 |
| 5,459,363 A | * | 10/1995 | Miyakawa et al. | 310/261.1 |
| 5,861,698 A | * | 1/1999 | Murphy | 310/214 |
| 5,883,456 A | * | 3/1999 | Gardner et al. | 29/598 |
| 6,849,972 B1 | | 2/2005 | Barnes et al. | |
| 6,941,639 B2 | | 9/2005 | Zhang et al. | |
| 7,122,931 B2 | | 10/2006 | Zhang et al. | |

* cited by examiner

*Primary Examiner*—Minh Trinh
(74) *Attorney, Agent, or Firm*—Nixon & Vanderhye P.C.

(57) ABSTRACT

Re-machining a generator rotor tooth dovetail results in a transition zone at an end of the partial re-machined cut, between a newly cut load surface and an original load surface of the rotor tooth. The transition zone is susceptible to stresses that may adversely affect the fatigue strength of the rotor tooth. These stresses can be reduced by the steps of (a) forming at least one axial undercut stress relief groove across the transition zone between the newly cut load surface and the original load surface, (b) cutting and shaping a wedge that will fit in the transition zone, and (c) securing the wedge across the transition zone.

8 Claims, 4 Drawing Sheets

METHOD FOR REDUCING STRESSES RESULTING FROM PARTIAL SLOT DOVETAIL RE-MACHINING FOR GENERATOR ROTOR

BACKGROUND OF THE INVENTION

The invention relates to re-machining a generator rotor tooth dovetail and, more particularly, to reducing stresses resulting from partial slot dovetail re-machining.

Severe galling or pitting of field dovetail load surfaces, mis-machining, or other causes may require re-machining of a new partial slot length dovetail in order to restore their required load bearing surface contact. Special fitting is then necessary to install oversized wedges in a transition zone between the newly cut load surface and the original load surface. The stresses in the transition zone and for several inches on either side of the transition zone may have unacceptably high stresses on either the rotor tooth or wedge, resulting in a possible reduction of fatigue life.

It would be desirable to reduce the stresses in the wedge and tooth such that partial slot dovetail machining can be implemented without sacrificing the fatigue life of the parts involved.

A conventional process of partial slot dovetail re-machining has been to fit wedges to "overhang" the transition zone, with the butt joint between wedges being lined up to the middle of the transition zone. When the transition zone gets too long, the tooth and wedge stresses become unacceptably high, and the re-machined dovetail would need to extend the length of the rotor body.

BRIEF DESCRIPTION OF THE INVENTION

In an exemplary embodiment, stresses susceptible from partially re-machining a generator rotor tooth dovetail can be reduced. The re-machining process results in a transition zone at an end of the partial re-machined cut, between a newly cut load surface and an original load surface of the rotor tooth. The method includes the steps of (a) forming a first axial undercut stress relief groove at a first fillet radius below the original load surface, and (b) forming a second axial undercut stress relief groove at a second fillet radius below the newly cut load surface.

In another exemplary embodiment, stresses in a transition zone between a newly cut load service and an original load surface resulting from partial re-machining of a generator rotor tooth dovetail can be reduced by the steps of (a) forming at least one axial undercut stress relief groove across the transition zone between the newly cut load surface and the original load surface, (b) cutting and shaping a wedge that will fit in the transition zone, and (c) securing the wedge across the transition zone.

DETAILED DESCRIPTION OF THE INVENTION

Figure 1:
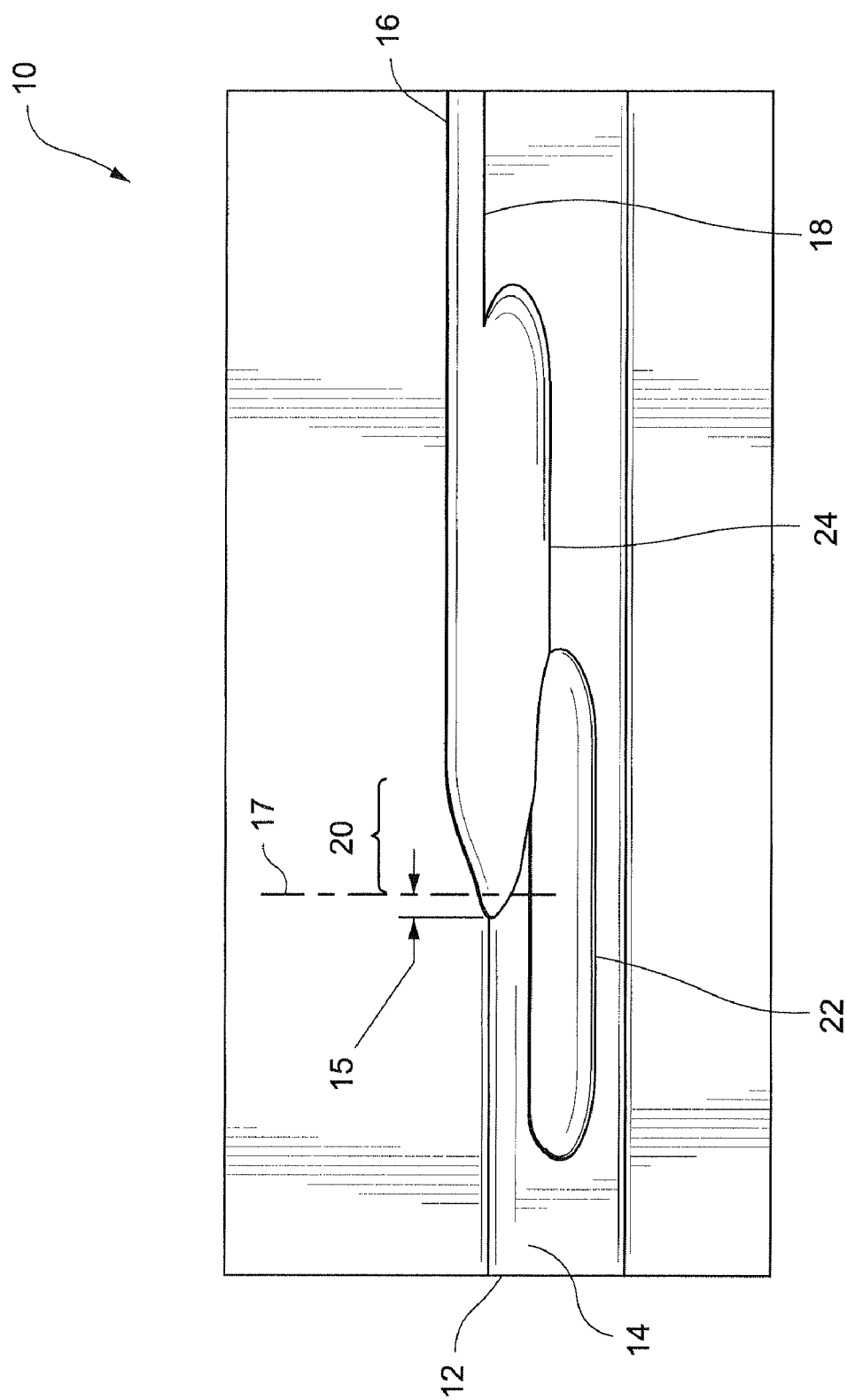
FIG. 1 is a cross sectional view through the generator rotor tooth showing the machining modifications.

Re-machining a generator rotor tooth dovetail for only a part of the length at a generator slot results in a transition zone at the end of the partial cut, between the newly cut load surface and the original load surface. FIG. 1 shows a cross section of the generator rotor tooth dovetail 10 showing the original load surface 12 including a fillet radius 14 below the original load surface 12 and a new load surface 16 with a fillet radius 18 below the new load surface 16. The transition zone 20 is shown between the new load surface 16 and the original load surface 12.

Figure 4:
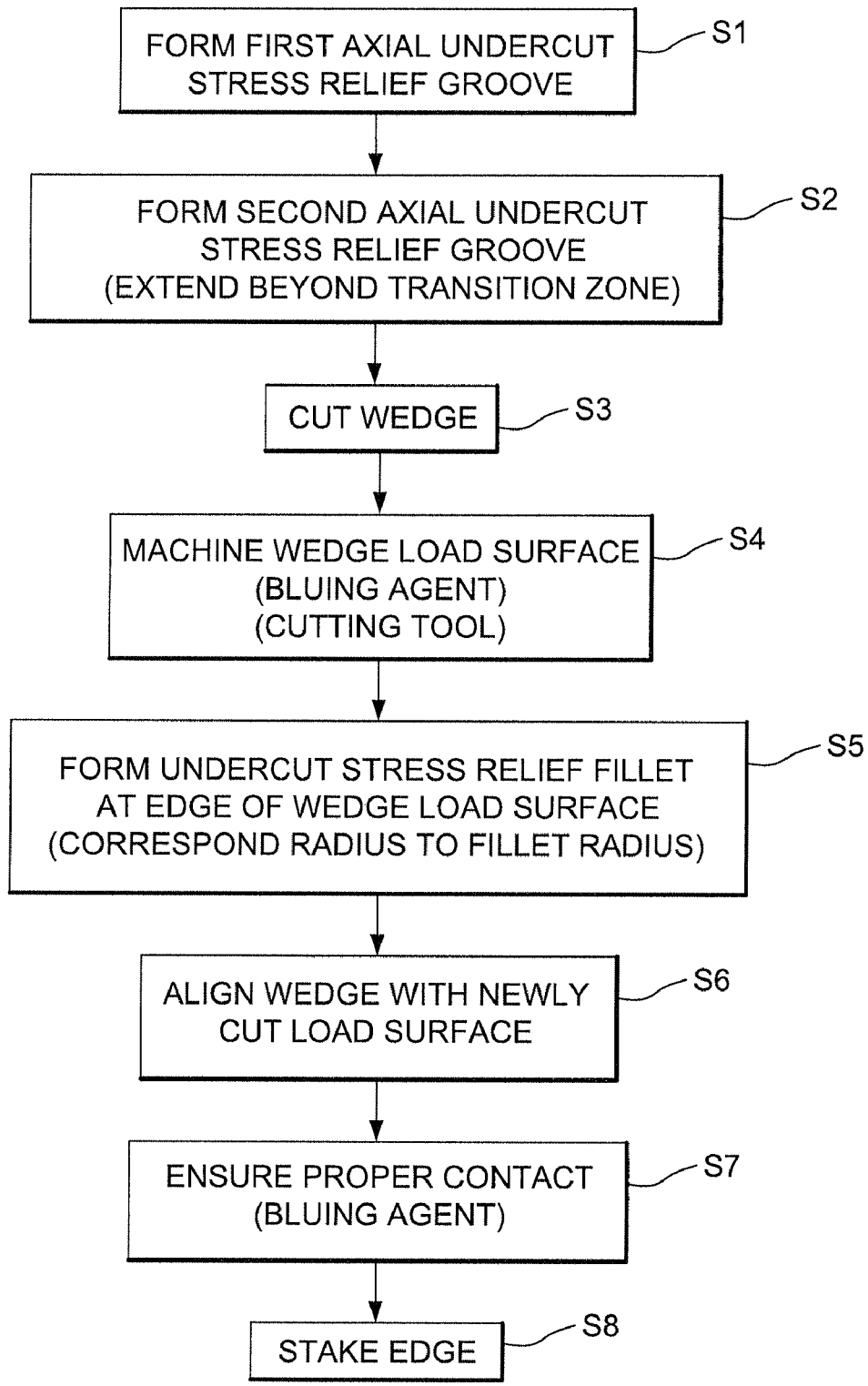
FIG. 4 is a flow chart showing the method of reducing stresses.

In order to reduce the stresses in the transition zone 20, several machining modifications can be made to the generator rotor tooth 10 and wedge 30 (FIG. 2) and to the assembly fit-up procedure of the wedge and tooth. With continued reference to FIG. 1 and with reference to FIG. 4, an axial undercut stress relief groove 22 can be formed at the fillet radius 14 below the original load surface 12(S1). This cut 22 extends in either direction for a distance between approximately 0.75-2" from the transition zone 20. The cut 22 serves to reduce the stress concentration factors in the fillet radius 14 below the original load surface 12.

Additionally, another axial undercut stress relief groove 24 can be formed at the fillet radius 18 below the newly re-machined load surface 16(S2). Outboard of the transition zone 20, this axial relief cut 24 extends for a distance between approximately 0.75-2". Inboard of the transition zone 20, the relief cut 24 extends slightly beyond the transition load surface while not removing much material on the original load surface 12 near its fillet radius 14.

It is desirable for the load surface in the transition zone 20 to have a stress relief along its entire length to achieve acceptable stress levels. Because of the geometry involved, the axial cutter that machines the stress relief should traverse slightly beyond the end of the transition zone 20, for an additional length of axial cut 15 of approximately 0.015-0.090", and may remove some surface from the original load surface 12. The dimensions of the cutter to machine the new dovetail, the location of the new dovetail load surface 16 relative to the original load surface 12, and the dimensions of the axial relief cutter are designed such that enough load bearing surface remains in the vicinity of the fillet radius 14 below the original load surface 12 to achieve acceptable stress levels in the tooth 10 and wedge 30.

Figure 2:
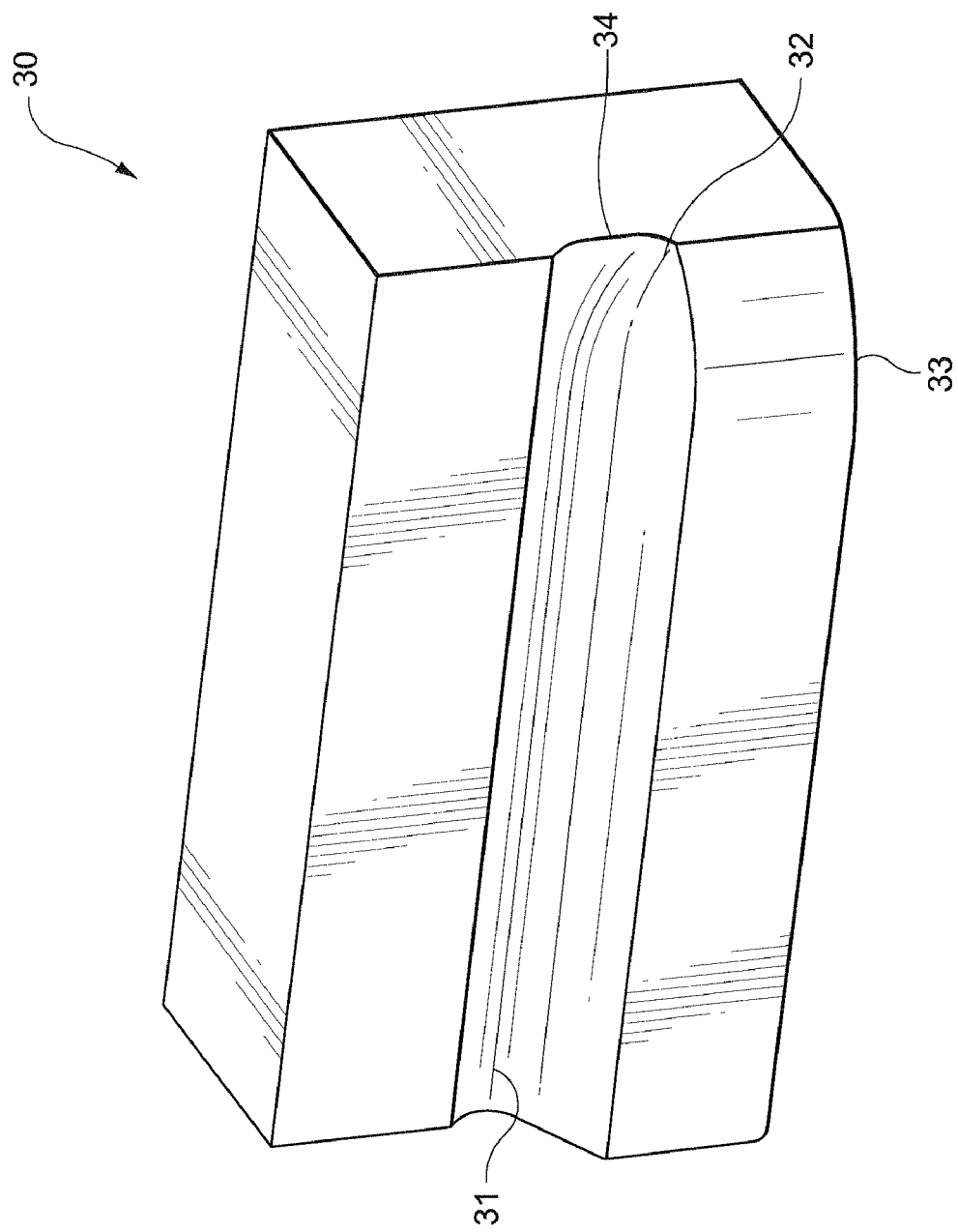
FIG. 2 is a perspective view showing modifications on the wedge.

With reference to FIG. 2, the fitted wedge 30 for the transition zone 20 also includes modifications. A concave cutter, preferably the same radius as the cutter used to repair the tooth dovetail 10, is used to cut the wedge 30 including a wedge main relief cut 31 and a concave cut 33 to fit snugly in the transition zone 20(S3). The fitted wedge 30 eliminates overhung wedges that do not have surface contact in the transition zone 20. This is desirable to obtain acceptable contact surface area in the transition length. Proper fit is achieved by using an ink or so-called "bluing" agent to identify the contact points between mating parts. The identified contact points are further machined to provide a better fit. A conical load surface 32 is machined on the wedge 30 and hand-worked to match the load surface in the transition zone 20 of the tooth 10(S4). This process serves to increase contact surface area in the transition length. Additionally, an undercut stress relief fillet 34 is incorporated at the edge of the conical load surface 32 of the wedge 30 that is of a similar radius as the wedge main relief cut 31 and blended smoothly for good transition(S5). The undercut stress relief fillet 34 further reduces the stress concentration in that area of the wedge 30 and reduces overall stress levels.

Figure 3:
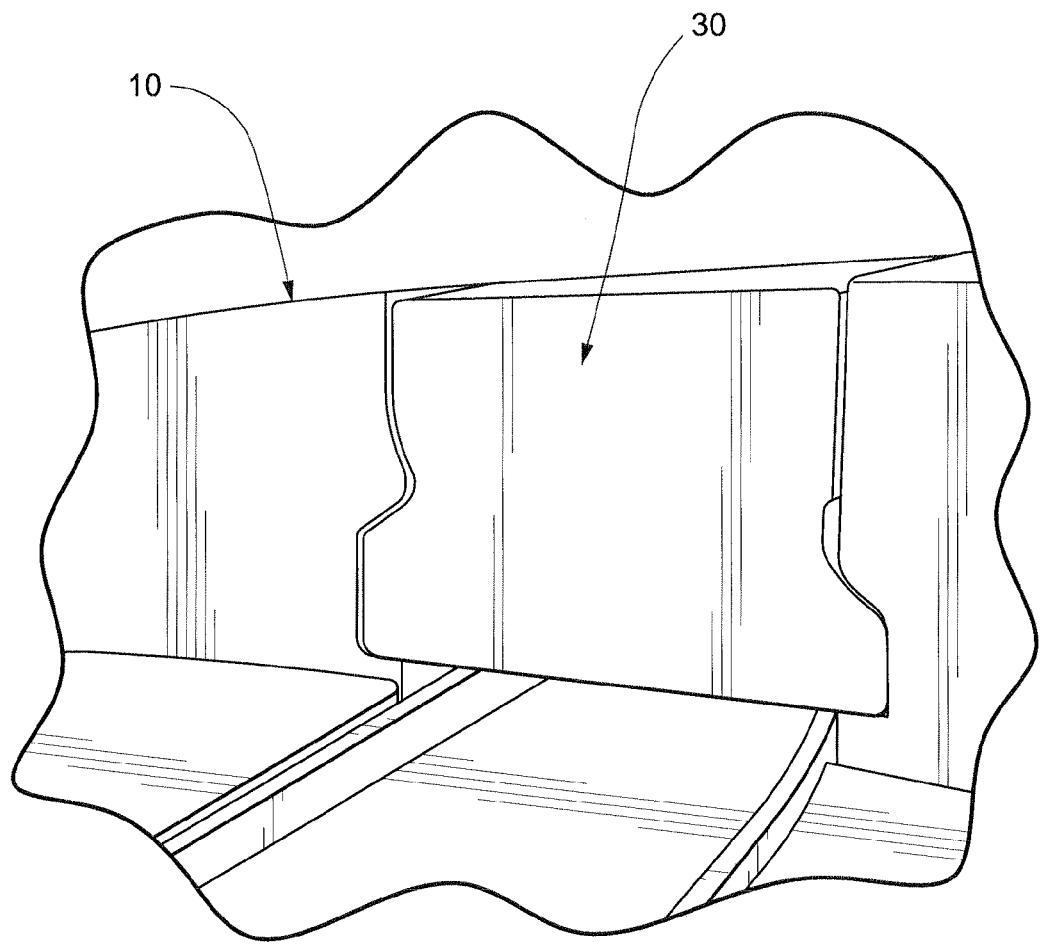
FIG. 3 shows an assembled re-machined rotor tooth.

FIG. 3 shows the wedge 30 installed in the rotor tooth 10. The fitted wedge 30 with its conical load surface 32 is lined up to the end of the new load surface cut 17(S6). The wedge load surface 32 is further machined using a bluing agent to obtain proper contact with the tooth 10 in the transition zone 20(S7). Once in position, the fitted wedge 30 is staked to prevent axial movement(S8).

With the described machining modifications, stresses in a transition zone can be reduced where a partial slot dovetail re-machining is applied to repair damage to a generator rotor tooth load-bearing surface. Stress reduction is achieved by modifications to the generator rotor tooth and wedge and to the assembly fit-up procedure of the wedge and tooth.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of reducing stresses susceptible from partially re-machining a generator rotor tooth dovetail, the re-machining resulting in a transition zone at an end of the partial re-machined cut, between a newly cut load surface and an original load surface of the rotor tooth, the method comprising:
   (a) providing the generator rotor tooth dovetail;
   (b) determining locations and dimensions of a first axial undercut stress relief groove and a second axial undercut stress relief groove;
   (c) re-machining the generator rotor tooth dovetail by machining the first axial undercut stress relief groove at a first fillet radius below the original load surface; and
   (d) further re-machining the generator rotor tooth dovetail by machining the second axial undercut stress relief groove at a second fillet radius below the newly cut load surface.

2. The method according to claim 1, wherein the generator rotor tooth dovetail includes a wedge, the method further comprising:
   (e) cutting the wedge so that it will fit in the transition zone;
   (f) machining a wedge load surface of the wedge to match a conical shape of the newly cut load surface in the transition zone; and
   (g) further re-machining the generator rotor tooth dovetail by machining an undercut stress relief fillet at an edge of the wedge load surface.

3. The method according to claim 2, further comprising:
   (h) aligning the wedge with an end of the newly cut load surface;
   (i) ensuring proper contact of the wedge with the rotor tooth in the transition zone; and
   (j) staking the wedge in position to prevent axial movement of the wedge.

4. The method according to claim 3, wherein step (i) is practiced using a bluing agent.

5. The method according to claim 2, wherein step (g) is practiced by machining the undercut stress relief fillet with a radius substantially corresponding to a fillet radius on the rest of the wedge.

6. The method according to claim 2, wherein step (f) is practiced using a bluing agent.

7. The method according to claim 2, wherein step (f) is practiced by using a cutting tool having the same radius as a cutter used for the partial re-machining of the rotor tooth dovetail.

8. The method according to claim 1, wherein step (d) is practiced by extending the second axial undercut stress relief groove beyond the transition zone.

* * * * *